US011616220B2

United States Patent
Daughenbaugh et al.

(10) Patent No.: US 11,616,220 B2
(45) Date of Patent: *Mar. 28, 2023

(54) ELECTRODEPOSITABLE COMPOSITIONS AND ELECTRODEPOSITED COATINGS INCLUDING GRAPHENIC CARBON PARTICLES

(71) Applicant: PPG Industries Ohio, Inc., Cleveland, OH (US)

(72) Inventors: Randy E. Daughenbaugh, Monroeville, PA (US); Noel R. Vanier, Wexford, PA (US); Stuart D. Hellring, Pittsburgh, PA (US); Cheng-Hung Hung, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 21 days.

This patent is subject to a terminal disclaimer.

(21) Appl. No.: 16/941,344

(22) Filed: Jul. 28, 2020

(65) Prior Publication Data
US 2020/0358075 A1    Nov. 12, 2020

Related U.S. Application Data

(60) Division of application No. 15/259,092, filed on Sep. 8, 2016, now Pat. No. 10,763,490, which is a continuation-in-part of application No. 14/867,307, filed on Sep. 28, 2015, now Pat. No. 9,520,591, and a continuation-in-part of application No. 14/831,047, filed on Aug. 20, 2015, now Pat. No. 9,870,844, and a continuation-in-part of application No. 14/530,007, filed on Oct. 31, 2014, now Pat. No. 9,761,903, which is a continuation-in-part of application No. 14/348,280, filed as application No. PCT/US2012/057811 on Sep. 28, 2012, now Pat. No. 9,221,688, (Continued)

(51) Int. Cl.
| | |
|---|---|
| H01M 4/04 | (2006.01) |
| H01M 10/0525 | (2010.01) |
| H01M 4/62 | (2006.01) |
| C25D 15/00 | (2006.01) |
| C09D 5/44 | (2006.01) |
| C25D 15/02 | (2006.01) |
| H01M 4/139 | (2010.01) |
| H01M 4/13 | (2010.01) |
| C09D 7/61 | (2018.01) |
| C08K 3/22 | (2006.01) |
| H01M 4/1397 | (2010.01) |
| C25D 13/16 | (2006.01) |
| H01M 4/136 | (2010.01) |
| H01M 4/131 | (2010.01) |
| H01M 10/052 | (2010.01) |
| H01M 4/1391 | (2010.01) |
| C08K 3/04 | (2006.01) |

(52) U.S. Cl.
CPC ............. *H01M 4/0457* (2013.01); *C08K 3/22* (2013.01); *C09D 5/448* (2013.01); *C09D 7/61* (2018.01); *C25D 15/00* (2013.01); *C25D 15/02* (2013.01); *H01M 4/0404* (2013.01); *H01M 4/13* (2013.01); *H01M 4/139* (2013.01); *H01M 4/622* (2013.01); *H01M 4/625* (2013.01); *H01M 10/0525* (2013.01); *C08K 3/042* (2017.05); *C08K 2003/2203* (2013.01); *C25D 13/16* (2013.01); *H01M 4/131* (2013.01); *H01M 4/136* (2013.01); *H01M 4/1391* (2013.01); *H01M 4/1397* (2013.01); *H01M 10/052* (2013.01)

(58) Field of Classification Search
CPC .... H01M 4/0457; H01M 4/0404; H01M 4/13; H01M 4/139; H01M 4/622; H01M 4/625; H01M 10/0525; H01M 4/131; H01M 4/136; H01M 4/1391; H01M 4/1397; H01M 10/052; C09D 7/61; C09D 5/448; C08K 3/22; C08K 3/042; C08K 2003/2203; C25D 15/00; C25D 15/02; C25D 13/16

See application file for complete search history.

(56) References Cited

U.S. PATENT DOCUMENTS

| | | |
|---|---|---|
| 3,455,806 A | 7/1969 | Spoor et al. |
| 3,869,366 A | 3/1975 | Suzuki et al. |
| 4,452,963 A | 6/1984 | Moriarity |
| 4,851,262 A | 7/1989 | McFeaters |
| 5,486,675 A | 1/1996 | Taylor et al. |
| 5,527,518 A | 6/1996 | Lynum et al. |

(Continued)

FOREIGN PATENT DOCUMENTS

| | | |
|---|---|---|
| CN | 102877109 | 1/2013 |
| CN | 103468057 | 12/2013 |

(Continued)

OTHER PUBLICATIONS

Bergeron "Production of Carbon by Prolysis of Methane in Thermal Plasma", Master's Thesis is Applied Sciences, University of Sherbrooke, Faculty of Applied Sciences, Department of Chemical Enginering, Quebec, Canada, Oct. 1997, (110 pp.).

(Continued)

Primary Examiner — Xiuyu Tai
(74) Attorney, Agent, or Firm — Alan G. Towner

(57) ABSTRACT

Electrodepositable compositions including an aqueous medium, an ionic resin and particles including thermally produced graphenic carbon nanoparticles are disclosed. The compositions may also include lithium-containing particles. Electrodeposited coatings comprising a cured ionic resin, thermally produced graphenic carbon nanoparticle and lithium-containing particles are also disclosed. The electrodeposited coatings may be used as coatings for lithium ion battery electrodes.

18 Claims, No Drawings

Related U.S. Application Data said application No. 14/867,307 is a continuation of application No. 13/686,003, filed on Nov. 27, 2012, now Pat. No. 9,150,736, said application No. 14/831,047 is a continuation-in-part of application No. 13/686,003, filed on Nov. 27, 2012, now Pat. No. 9,150,736, said application No. PCT/US2012/057811 is a continuation-in-part of application No. 13/309,894, filed on Dec. 2, 2011, now Pat. No. 8,486,364, which is a continuation-in-part of application No. 13/249,315, filed on Sep. 30, 2011, now Pat. No. 8,486,363, said application No. PCT/US2012/057811 is a continuation-in-part of application No. 13/249,315, filed on Sep. 30, 2011, now Pat. No. 8,486,363.

(56) References Cited

U.S. PATENT DOCUMENTS

| | | |
|---|---|---|
| 5,749,937 A | 5/1998 | Detering et al. |
| 5,763,548 A | 6/1998 | Matyjaszewski et al. |
| 5,788,738 A | 8/1998 | Pirzada et al. |
| 5,789,487 A | 8/1998 | Matyjaszewski et al. |
| 5,807,937 A | 9/1998 | Matyjaszewski et al. |
| 5,837,766 A | 11/1998 | Metro et al. |
| 5,851,507 A | 12/1998 | Pirzada et al. |
| 5,935,293 A | 8/1999 | Detering et al. |
| 5,984,997 A | 11/1999 | Bickmore et al. |
| 5,989,648 A | 11/1999 | Phillips |
| 6,099,696 A | 8/2000 | Schwob et al. |
| 6,228,904 B1 | 5/2001 | Yadav et al. |
| 6,316,119 B1 | 11/2001 | Metzger et al. |
| 6,358,375 B1 | 3/2002 | Schwob |
| 6,441,066 B1 | 8/2002 | Woodworth et al. |
| RE37,853 E | 9/2002 | Detering et al. |
| 6,652,967 B2 | 11/2003 | Yadav et al. |
| 6,669,823 B1 | 12/2003 | Sarkas et al. |
| 6,689,192 B1 | 2/2004 | Phillips et al. |
| 6,716,525 B1 | 4/2004 | Yadav et al. |
| 6,719,821 B2 | 4/2004 | Yadav et al. |
| 6,786,950 B2 | 9/2004 | Yadav et al. |
| 6,821,500 B2 | 11/2004 | Fincke et al. |
| 6,830,822 B2 | 12/2004 | Yadav |
| 6,849,109 B2 | 2/2005 | Yadav et al. |
| 6,855,273 B2 | 2/2005 | Ravet et al. |
| 7,071,258 B1 | 7/2006 | Jang et al. |
| 7,285,201 B2 | 10/2007 | Emmonds et al. |
| 7,635,458 B1 | 12/2009 | Hung et al. |
| 7,754,184 B2 | 7/2010 | Mercuri |
| 7,776,303 B2 | 8/2010 | Hung et al. |
| 7,785,492 B1 | 8/2010 | Jang et al. |
| 7,790,285 B2 | 9/2010 | Zhamu et al. |
| 7,824,741 B2 | 11/2010 | Sandhu |
| 7,842,271 B2 | 11/2010 | Petrik |
| 8,047,248 B2 | 11/2011 | Prud'homme et al. |
| 8,048,950 B2 | 11/2011 | Prud'homme et al. |
| 8,129,466 B2 | 3/2012 | Polk et al. |
| 8,168,058 B2 | 5/2012 | Ho et al. |
| 8,237,538 B2 | 8/2012 | Braun et al. |
| 8,247,116 B2 | 8/2012 | He et al. |
| 8,372,257 B2 | 2/2013 | Fujii et al. |
| 8,486,363 B2 | 7/2013 | Hung et al. |
| 8,486,364 B2 | 7/2013 | Vanier et al. |
| 9,039,938 B2 | 5/2015 | Crain et al. |
| 9,546,092 B2 | 1/2017 | Aksay et al. |
| 9,574,094 B2 | 2/2017 | Decker et al. |
| 9,647,263 B2 | 5/2017 | Green |
| 9,653,733 B2 | 5/2017 | Hochgatterer et al. |
| 10,763,490 B2 | 9/2020 | Daughenbaugh et al. |
| 2002/0114949 A1 | 8/2002 | Bower et al. |
| 2003/0151032 A1 | 8/2003 | Ito et al. |
| 2004/0247515 A1 | 12/2004 | Gardner |
| 2005/0271574 A1 | 12/2005 | Jang et al. |
| 2005/0272214 A1 | 12/2005 | Chiang et al. |
| 2006/0093885 A1 | 5/2006 | Krusic et al. |
| 2006/0121279 A1 | 6/2006 | Petrik |
| 2006/0216222 A1 | 9/2006 | Jang |
| 2007/0015873 A1 | 1/2007 | Fenn |
| 2007/0045116 A1 | 3/2007 | Hung et al. |
| 2007/0096066 A1 | 5/2007 | Yoshida et al. |
| 2007/0237705 A1 | 10/2007 | Itoh et al. |
| 2008/0081256 A1 | 4/2008 | Madou et al. |
| 2008/0206124 A1 | 8/2008 | Jang et al. |
| 2009/0022649 A1 | 1/2009 | Zhamu et al. |
| 2009/0054581 A1 | 2/2009 | Prud'Homme et al. |
| 2009/0068471 A1 | 3/2009 | Choi et al. |
| 2009/0075035 A1 | 3/2009 | O'Brien et al. |
| 2009/0110627 A1 | 4/2009 | Choi et al. |
| 2009/0117467 A1 | 5/2009 | Zhamu et al. |
| 2009/0169467 A1 | 7/2009 | Zhamu et al. |
| 2010/0036023 A1 | 2/2010 | Weng et al. |
| 2010/0047154 A1 | 2/2010 | Lee et al. |
| 2010/0055017 A1 | 3/2010 | Vanier et al. |
| 2010/0055025 A1 | 3/2010 | Jang et al. |
| 2010/0072430 A1 | 3/2010 | Gergely et al. |
| 2010/0096597 A1 | 4/2010 | Prud'Homme et al. |
| 2010/0126660 A1 | 5/2010 | O'Hara |
| 2010/0143798 A1 | 6/2010 | Zhamu et al. |
| 2010/0247801 A1 | 9/2010 | Zenasni |
| 2010/0255219 A1 | 10/2010 | Wenxu et al. |
| 2010/0301212 A1 | 12/2010 | Dato et al. |
| 2010/0303706 A1 | 12/2010 | Wallace et al. |
| 2010/0314788 A1 | 12/2010 | Hung et al. |
| 2010/0323113 A1 | 12/2010 | Ramappa et al. |
| 2011/0046289 A1 | 2/2011 | Zhamu et al. |
| 2011/0070426 A1 | 3/2011 | Vanier et al. |
| 2011/0244210 A1 | 10/2011 | Choi et al. |
| 2012/0021160 A1 | 1/2012 | Kariyada |
| 2012/0058397 A1 | 3/2012 | Zhamu et al. |
| 2012/0064409 A1 | 3/2012 | Zhamu et al. |
| 2012/0068160 A1 | 3/2012 | Yamazaki et al. |
| 2012/0073971 A1 | 3/2012 | Prieto et al. |
| 2012/0114551 A1 | 5/2012 | Coleman |
| 2012/0142832 A1 | 6/2012 | Varma et al. |
| 2012/0211160 A1 | 8/2012 | Asay et al. |
| 2012/0237749 A1 | 9/2012 | Aksay et al. |
| 2012/0277360 A1 | 11/2012 | Scheffer et al. |
| 2012/0301707 A1 | 11/2012 | Kinloch et al. |
| 2013/0296479 A1 | 11/2013 | Martin et al. |
| 2013/0337258 A1 | 12/2013 | Schwendeman et al. |
| 2013/0341194 A1 | 12/2013 | Fuchsbichler et al. |
| 2014/0057165 A1 | 2/2014 | Yamakaji et al. |
| 2014/0144778 A1 | 5/2014 | Daughenbaugh et al. |
| 2014/0190836 A1 | 7/2014 | Gebregiorgis |
| 2014/0212656 A1 | 7/2014 | Rudhardt et al. |
| 2014/0272591 A1 | 9/2014 | Vanier et al. |
| 2015/0017447 A1 | 1/2015 | Moravek et al. |
| 2015/0159024 A1 | 6/2015 | Decker et al. |
| 2015/0357079 A1 | 12/2015 | Daughenbaugh et al. |
| 2017/0222210 A1 | 8/2017 | Xiao |

FOREIGN PATENT DOCUMENTS

| | | |
|---|---|---|
| DE | 102011003619 | 8/2012 |
| EP | 2490284 | 8/2012 |
| KR | 20130013689 | 2/2012 |
| KR | 20120029530 | 3/2012 |
| WO | 1998040415 | 9/1998 |
| WO | 2013049498 | 4/2013 |
| WO | 2013166414 | 11/2013 |
| WO | 2014070346 | 5/2014 |

OTHER PUBLICATIONS

Cassagneau et al., "Preparation of Layer-by-Layer Self-Assembly of Silver Nanoparticles Capped by Graphite Oxide Nanosheets", J. Phys. Chem. B 1999, 103, pp. 1789-1793.

Chen et al., "Oxidation Resistance of Graphene-Coated Cu and Cu/Ni Alloy" American Chemical Society, ACS Nano, Jan. 28, 2011, vol. 5, No. 2, pp. 1321-1327.

(56) References Cited

OTHER PUBLICATIONS

Choi et al., "Fabrication of Free-Standing Multilayered Graphene and Poly(3,4-ethylenedioxythiophene) Composite Films with Enhanced Conductive and Mechanical Properties", Langmuir, 26 (15), 2010, pp. 12902-12908.
Coraux et al., "Growth of Graphene on Ir(111)", New Journal of Physics 11, 2009, 023006, pp. 1-22.
Dato et al., "Substrate-Free Gas-Phase Synthesis of Graphene Sheets", Nano Letters, vol. 8, No. 7, 2008, pp. 2012-2016.
Dresselhaus et al., "Science of Fullerenes and Carbon Nanotubes", Academic Press, Inc., 1996, pp. 60-79.
Du et al., "Facile Synthesis of Highly Conductive Polyaniline/Graphite Nanocomposites", European Polymer Journal 40, 2000, pp. 1489-1493.
Fincke et al., "Plasma Pyrolysis of Methane to Hydrogen and Carbon Black", Industrial and Engineering Chemistry Research, vol. 41, No. 6, 2002, pp. 1425-1435.
Fitzer et al., "Recommended Terminology for the Description of Carbon as a Solid", International Union of Pure and Applied Chemistry, Inorganic Chemistry Division, Pure Applied Chemistry, vol. 67, No. 3, 1995, pp. 473-506.
Gannon, "Acetylene from Hydrocarbons", Kirk-Othmer Encyclopedia of Chemical Technology, 2000, pp. 1-28.
Gomez De Arco et al., "Synthesis, Transfer, and Devices of Single- and Few-Layer Graphene by Chemical Vapor Deposition", IEEE Transactions on Nanotechnology, vol. 8, No. 2, Mar. 2009, pp. 135-138.
Gonzalez-Aguilar et al., "Carbon Nanostructures Production by Gas-Phase Plasma Processes at Atmospheric Pressure", J. Phys. D, Appl. Phys., vol. 40, 2007, pp. 2361-2374.
Holmen et al., "High-Temperature Pyrolysis of Hydrocarbons. 1. Methane to Acetylene", The Norwegian Institute of Technology, University of Trondheim, Ind. Eng. Chem., Process Des. Dev., vol. 15, No. 3, 1976, pp. 439-444.
Ji et al., "Graphene/Si Multilayer Structure Anodes for Advanced Half and Full Lithium-Ion Cells", Nano Energy, 2011, pp. 1-8.
Kang et al., "Effects of Carbonaceous Materials on the Physical and Electrochemical Performance of a LIFePO4 Cathode for Lithium-Ion Batteries", New Carbon Materials, 2011, 26(3), pp. 161-170.
Khan et al., "Survey of Recent Methane Pyrolysis Literature", Industrial and Engineering Chemistry, vol. 62, No. 10, Oct. 1970, pp. 54-59.
Kim et al., "Continuous Synthesis of Nanostructured Sheetlike Carbons by Thermal Plasma Decomposition of Methane", IEEE Transactions on Plasma Science, vol. 35, No. 2, Apr. 2007, pp. 434-443.
Kim et al., "Fabrication of Graphene Flakes Composed of Multi-Layer Graphene Sheets Using a Thermal Plasma Jet System", Nanotechnology 21, 2010, IOP Publishing, pp. 1-6.
Kostic et al., "Thermodynamic Consideration of B—O—C—H System for Boron Carbide (B4C) Powder Synthesis in Thermal Plasma", Progress in Plasma Processing of Materials, 1997, pp. 889-898.
Lavoie, "Synthesis of Carbon Black from Propane Using a Thermal Plasma", Master's Thesis in Applied Sciences, University of Sherbrooke, Faculty of Applied Sciences, Department of Chemical Engineering, Quebec, Canada, Sep. 1997, 138 pp.

Malesevic et al., "Synthesis of Few-Layer Graphene via Microwave Plasma-Enhanced Chemical Vapour Deposition", Nanotechnology 19, 2008, IOP Publishing, pp. 1-6.
Martin-Gallego et al., "Epoxy-Graphene UV-Cured Nanocomposites", Polymer, vol. 52, 2011, pp. 4664-4669.
Mazor et al., "Electrophoretic Deposition of Lithium Iron Phosphate Cathode for Thin-Film 3D-Microbatteries", Journal of Power Sources 198, 2012, Elsevier B.V., pp. 264-272.
McWilliams, "Graphene: Technologies, Applications, and Markets", BCC Research, Market Research Report, Feb. 2011, 28 pp.
Nandamuri et al., "Chemical Vapor Deposition of Graphene Films", Nanotechnology 21, 2010, IOP Publishing, pp. 1-4.
Prasai et al., "Graphene: Corrosion-Inhibiting Coating", ACS Nano, 6, 2012, pp. 1102-1108.
Pristavita et al., "Carbon Blacks Produced by Thermal Plasma: the Influence of the Reactor Geometry on the Product Morphology", Plasma Chem. Plasma Process, 30, 2010, pp. 267-279.
Pristavita et al., "Carbon Nano-Flakes Produced by an Inductively Coupled Thermal Plasma System for Catalyst Applications", Plasma Chem. Plasma Process, 31, 2011, pp. 393-403.
Pristavita et al., "Carbon Nanoparticle Production by Inductively Coupled Thermal Plasmas: Controlling the Thermal History of Particle Nucleation", Plasma Chem. Plasma Process, 31, 2011, pp. 851-866.
Rafiee et al., "Enhanced Mechanical Properties of Nanocomposites at Low Graphene Content", ACSNano, vol. 3, No. 12, 2009, pp. 3884-3890.
Skinner, "Pyrolysis of Methane and the C2 Hydrocarbons", Monsanto Chemical Co., Research and Engineering Division, Dayton 7, Ohio, 1959, pp. 59-68.
Su et al., "Could Graphene Construct an Effective Conducting Network in a High-Power Lithium Ion Battery?", Nano Energy 1, 2012, pp. 429-439.
Su et al., "Flexible and Planar Graphene Conductive Additives for Lithium-Ion Batteries", Journal of Materials Chemistry, 2010, (20), pp. 9644-9650.
Subrahmanyam et al., "Simple Method of Preparing Graphene Flakes by an Arc-Discharge Method", The Journal of Physical Chemistry C, vol. 113, No. 11, 2009, pp. 4257-4259.
Tagawa et al., "Production Processes for Fabrication of Lithium-Ion Batteries", Lithium Ion Batteries, 2009, Chapter 8, Springer, New York, USA, pp. 181-194.
Tang et al., "Processible Nanostructured Materials with Electrical Conductivity and Magnetic Susceptibility: Preparation and Properties of Maghemite/Polyaniline Nanocomposite Films", Chem. Mater., vol. 11, No. 6, 1999, pp. 1581-1589.
Zhong et al., "Catalytic Growth of Carbon Nanoballs With and Without Cobalt Encapsulation", Chemical Physics Letters 330, 2000, pp. 41-47.
Chaunxin et al., "Handbook of Surface Treatment Techniques", Beijing University of Technology Press, 1st Edition, Jul. 31, 2009, 3 pages.
Thomas Swan Advanced Materials, "Elicarb® Graphene Powder and Elicarb® Graphene Dispersion (AQ)", 2014, 2 pages.
XG Sciences, The Material Difference, "xGnP® Graphene Nanoplatelets: A unique carbon nonomaterial with multifunctional properties", 2013, 3 pages.

ELECTRODEPOSITABLE COMPOSITIONS AND ELECTRODEPOSITED COATINGS INCLUDING GRAPHENIC CARBON PARTICLES

CROSS REFERENCE TO RELATED APPLICATIONS

This application is a divisional of U.S. patent application Ser. No. 15/259,092 filed Sep. 8, 2016, which is a continuation-in-part of U.S. patent application Ser. No. 14/867,307 filed Sep. 28, 2015, now U.S. Pat. No. 9,520,591, which is a continuation of U.S. patent application Ser. No. 13/686,003 filed Nov. 27, 2012, now U.S. Pat. No. 9,150,736. U.S. patent application Ser. No. 15/259,092 is also a continuation-in-part of U.S. patent application Ser. No. 14/831,047 filed Aug. 20, 2015, now U.S. Pat. No. 9,870,844, which is a continuation-in-part of U.S. patent application Ser. No. 13/686,003 filed Nov. 27, 2012, now U.S. Pat. No. 9,150,736. U.S. patent application Ser. No. 15/259,092 is also a continuation-in-part of U.S. patent application Ser. No. 14/530,007 filed Oct. 31, 2014, now U.S. Pat. No. 9,761,903, which is a continuation-in-part of U.S. patent application Ser. No. 14/348,280 filed Mar. 28, 2014, now U.S. Pat. No. 9,221,688, which is a national phase of PCT Int'l Patent Application Serial No. PCT/US2012/057811 filed Sep. 28, 2012 which is both a continuation-in-part of U.S. patent application Ser. No. 13/249,315 filed Sep. 30, 2011, now U.S. Pat. No. 8,486,363, and also a continuation-in-part of U.S. patent application Ser. No. 13/309,894 filed Dec. 2, 2011, now U.S. Pat. No. 8,486,364, which is a continuation-in-part of Ser. No. 13/249,315, now U.S. Pat. No. 8,486,363. All of these applications and patents are incorporated herein by reference.

FIELD OF THE INVENTION

The present invention relates to the coating of electrically conductive substrates by electrodeposition of compositions including graphenic carbon particles and a resin.

BACKGROUND OF THE INVENTION

Electrodeposition as a coating application method involves the deposition onto an electrically conductive substrate of a composition under the influence of an applied electrical potential. A coating is deposited as the substrate is immersed in the composition, the substrate serving as an electrode in an electrical circuit of the electrode and a counter-electrode immersed in the composition, the coating being applied to the substrate as electric current is passed between the electrodes.

Often, the composition used in an electrodeposition process includes a resinous phase dispersed in an aqueous medium. While the composition into which the substrate is immersed may include pigments to provide color and other fillers and additives, the properties historically sought by electrodeposited coatings, such as outstanding corrosion resistance, arise primarily because of the deposition of a continuous resinous film. Therefore, the resin content of the composition into which the substrate is immersed is relatively high in relation to the amount of pigment and other fillers. For example, such compositions usually contain 0.02 to 1 part by weight pigment to 1 part by weight resinous phase.

Lithium ion batteries consist of a cathode, an anode, a separator, and an electrolyte. The cathode is a metal (often aluminum) foil substrate having a lithium-containing active material, such as $LiFePO_4$, deposited thereon. The lithium-containing active material is deposited on the substrate from a slurry containing the lithium-containing active material, conductive carbon, and binder (such as polyvinylidene difluoride) in organic solvent (such as n-methyl-2-pyrrolidone) via a slot die coater or a roll coater. In these slurries, the sum of the amount of lithium-containing active material and conductive carbon is high relative to the amount of binder, typically at least 9 parts by weight to 1 part by weight. The use of such solvent-borne slurries is, however, environmentally undesirable.

As a result, alternative methods and compositions for depositing lithium-containing compositions on a metal foil are desired. The present invention was made in view of the foregoing.

SUMMARY OF THE INVENTION

An aspect of the invention provides an electrodepositable composition comprising an aqueous medium, an ionic resin, and solid particles comprising graphenic carbon particles comprising thermally produced graphenic carbon particles produced in a thermal zone at a temperature of from greater than 3,500° C. to 20,000° C., have a Raman spectroscopy 2D/G peak ratio of at least 1:1, and have an average aspect ratio of greater than 3:1, and lithium-containing particles, wherein the composition has a weight ratio of solid particles to ionic resin of at least 4:1.

Another aspect of the invention provides a lithium ion battery electrode coating electrodeposited on a substrate, the electrodeposited coating comprising a cured ionic resin, and solid particles comprising graphenic carbon particles comprising thermally produced graphenic carbon particles produced in a thermal zone at a temperature of from greater than 3,500° C. to 20,000° C., have a Raman spectroscopy 2D/G peak ratio of at least 1:1, and have an average aspect ratio of greater than 3:1, and lithium-containing particles, wherein the coating has a weight ratio of solid particles to cured ionic resin of at least 4:1.

DETAILED DESCRIPTION OF EMBODIMENTS OF THE INVENTION

For purposes of this detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated, certain embodiments of the present invention are directed to methods that comprise immersing an electrically conductive substrate into an electrodepositable composition. Electrically conductive substrates suitable for use in the methods described herein include metallic substrates as well as electrically conductive composite materials, such as polymeric materials containing a sufficient amount of conductive filler, such as conductive carbon particles, carbon nanotubes, carbon fibers, fullerenes, graphene and the like. Suitable metallic substrates include, but are not limited to, ferrous and non-ferrous metals. Suitable ferrous metals include iron, steel, and alloys thereof. Non-limiting examples of useful steel materials include cold-rolled steel, galvanized (zinc coated) steel, electrogalvanized steel, stainless steel, pickled steel, GALVANNEAL, GALVALUME, and GALVAN zinc-aluminum alloys coated upon steel, and combinations thereof. Useful non-ferrous metals include aluminum, copper, manganese, nickel, zinc, magnesium, and alloys thereof. Combinations or composites of ferrous and non-ferrous metals can also be used.

In certain embodiments, the substrate is embodied in the form of a sheet, coil, or foil. As used herein, the term "foil" refers to a thin and pliable sheet of metal. The foil may be a continuous sheet, or may be perforated, mesh-like, screen-like, etc. Such foils may be constructed of, for example, aluminum, iron, copper, manganese, nickel, combinations thereof, and/or alloys thereof. In certain embodiments, the thickness of the foil, such as a foil comprising aluminum, is no more than 8 mils (203.2 µm), such as no more than 4 mils (101.6 µm), no more than 2 mils (50.8 µm), or, in some cases no more than 1 mil (25.4 µm), and/or at least 0.1 mil (2.54 µm), such as at least 0.2 mil (5.08 µm), at least 0.4 mils (10.2 µm), or at least 0.5 mil (12.7 µm).

The methods of the present invention comprise immersing the electrically conductive substrate into an electrodepositable composition, the substrate serving as an electrode in an electrical circuit comprising the electrode and a counter-electrode immersed in the composition, a coating being applied onto or over at least a portion of the substrate as electric current is passed between the electrodes. As used herein, the phrase "onto or over" means that the coating may be applied directly on at least a portion of the substrate surface or the coating may be applied over any coating or pretreatment material which was previously applied to at least a portion of the substrate surface.

As used herein, the term "electrodepositable composition" refers to a composition that includes components that are electrodepositable. As used herein, the term "electrodepositable" means capable of being deposited onto an electrically conductive substrate under the influence of an applied electrical potential.

The electrodepositable compositions used in the methods of the present invention comprise an aqueous medium. As used herein, the term "aqueous medium" refers to a medium that either consists exclusively of water or comprises predominantly water in combination with inert organic cosolvent(s). In certain embodiments, the organic cosolvents are at least partially soluble with water. Examples of such solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. Other at least partially water-miscible solvents may include coalescing solvents such as triethyl phosphate, triacetin, dipropylene diacetate, and the like. If used, the organic cosolvents are, in certain embodiments, used in amounts less than 25 percent by weight, less than 20 percent by weight, or, in some cases, less than 10 percent by weight, such as less than 5 percent by weight, based on total weight of water in the composition.

In certain embodiments, the aqueous medium is present in the composition used in the methods of the present invention in an amount of at least 75 percent by weight, at least 90 percent by weight, or at least 95 percent by weight, such as 75 to 99.5 percent by weight, 90 to 99 percent by weight, or, in some cases, 95 to 99 percent by weight, based on the total weight of the composition. In other words, the compositions used in the methods of the present invention may have a relatively low total solids content, as described further below.

The electrodepositable compositions used in the methods of the present invention comprise an ionic resin. As used herein, the term "ionic resin" refers to any resin that carries a charge, including resins that carry a negatively charged ion and resins that carry a positively charged ion. Suitable ionic resins include, therefore, anionic resins and cationic resins.

In certain embodiments of the present invention, the ionic resin comprises an anionic salt group-containing resin. Suitable anionic resins include resins that contain at least partially neutralized anionic groups, such as acid groups, such as carboxylic acid groups, which impart a negative charge. Non-limiting examples of suitable anionic resins, therefore, include base-neutralized, carboxylic acid group-containing resins.

In certain embodiments, the anionic resin comprises a water-soluble anionic resin. As used herein, the term "water soluble resin" means that a resin is capable of being essentially uniformly blended and/or molecularly or ionically dispersed in water to form a true solution. See R. Lewis, Sr., Hawley's Condensed Chemical Dictionary, ($12^{th}$ Ed. 1993) at page 586. In certain embodiments, the water-soluble anionic resin comprises a cellulose derivative, such as is the case with carboxymethylcellulose and salts thereof (CMC). CMC is a cellulosic ether in which a portion of the hydroxyl groups on the anhydroglucose rings are substituted with carboxymethyl groups. The degree of carboxymethyl substitution can range from 0.4-3. Since CMC is a long chain polymer, its viscosity in aqueous solutions depends on its molecular weight that can vary between 50,000 and 2,000,000 on a weight average basis. In certain embodiments, the carboxymethylcellulose has a weight average molecular weight of at least 50,000, such as at least 100,000, or some cases, at least 200,000, such as 50,000 to 1,000,000, 100,000 to 500,000, or 200,000 to 300,000. Both the degree of substitution and the viscosity of aqueous solutions can be determined via ASTM D 1439-03. Molecular weight is typically estimated from the viscosity of standard CMC solutions. According to one method, the molecular weight of CMC can be estimated using viscosity by:

$$\eta[Pa\ S] = 8.91 \times 10^{-4} + 1.30 \times 10^{-5} cM_W^{0.9} + 5.33 \times 10^{-8} c^2 M_W^{1.8} + 4.60 \times 10^{-15} c^{4.34} M_W^{3.91}$$

where η is viscosity, c is CMC concentration, $M_W$ is molecular weight, as described by Kulicke in Polymer Vol. 37 No. 13, pp. 2723-2731, 1996.

In certain embodiments of the present invention, the water soluble anionic resin, such as a cellulose derivative, such as carboxymethylcellulose, is present in an amount of at least 50 percent by weight, such as at least 60 percent by weight, at least 70 percent by weight, at least 80 percent by weight, or, in some cases, at least 90 percent by weight, based on the total weight of resin solids in the composition. In certain embodiments, the water soluble anionic resin, such as a cellulose derivative, such as carboxymethylcellulose, is present in an amount of no more than 20 percent by weight, no more than 15 percent by weight, no more than 10 percent by weight, no more than 5 percent by weight, such as 1 to 20 percent by weight, 1 to 15 percent by weight, 5 to 15 percent by weight, or, in some cases, 1 to 3 percent by weight, based on the total weight of solids in the composition. As used herein, the term "total weight of solids" refers to the total non-volatile content of the composition, i.e., the content of materials in the composition that will not volatilize when heated and excludes water and organic solvents.

In certain embodiments, in addition to a water-soluble anionic resin, the composition may also comprise a water dispersible anionic resin. As used herein, a "water dispersible resin" means a resin that is capable of being distributed throughout water as finely divided particles. See Hawley's at page 435.

Examples of water dispersible anionic resins that are suitable for use in the compositions described herein in combination with a water soluble anionic resin include the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the interpolymers of hydroxy-alkyl esters of unsaturated carboxylic acids, unsaturated carboxylic acid and at least one other ethylenically unsaturated monomer.

Other suitable water dispersible anionic resins are mixtures of alkyd resin and an amine-aldehyde resin, mixed esters of a resinous polyol, and phosphatized polyepoxides or phosphatized acrylic resins, such as those disclosed in EP0469491B1 at page 2, line 56 to page 3, line 56, U.S. Patent Application Publication No. 2009-0045071 at [0004]-[0015] and U.S. patent application Ser. No. 13/232,093 at [0014]-[0040], the cited portions of which being incorporated herein by reference. Also suitable are those resins comprising one or more pendent carbamate functional groups, such as those described in U.S. Pat. No. 6,165,338.

In certain embodiments, the composition comprises an anionic resin composition comprising a water soluble anionic resin, such as a cellulose derivative, such as carboxymethylcellulose, and a water dispersible anionic resin, different from the cellulose derivative, wherein the water dispersible anionic resin is present in the composition in an amount of less than 50 percent by weight, such as less than 40 percent by weight, less than 30 percent by weight, less than 20 percent by weight, or, in some cases, less than 10 percent by weight, based on the total weight of anionic resin in the composition.

As will be appreciated, in adapting an anionic resin to be solubilized or dispersed in an aqueous medium, it is often at least partially neutralized with a base. Suitable bases include both organic and inorganic bases. Illustrative examples of suitable bases are ammonia, monoalkylamines, dialkylamines, or trialkylamines such as ethylamine, propylamine, dimethylamine, dibutylamine and cyclohexylamine; monoalkanolamine, dialkanolamine or trialkanolamine such as ethanolamine, diethanolamine, triethanolamine, propanolamine, isopropanolamine, diisopropanolamine, dimethylethanolamine and diethylethanolamine; morpholine, e.g., N-methylmorpholine or N-ethylmorpholine. Examples of suitable inorganic bases include the hydroxide, carbonate, bicarbonate, and acetate bases of alkali or alkaline metals, specific examples of which include potassium hydroxide, lithium hydroxide, and sodium hydroxide. As a result, in certain embodiments, the composition comprises an alkali salt of a cellulose derivative, such as sodium carboxymethylcellulose, potassium carboxymethylcellulose and/or lithium carboxymethylcellulose. In certain embodiments, the resin(s) are at least partially neutralized from 20 to 200 percent, 40 to 150 percent, such as 60 to 120 percent neutralization.

In certain embodiments, the water dispersible anionic resin described above comprises an active hydrogen-containing, anionic salt group-containing resin and the composition further comprises a curing agent that comprises reactive groups that are reactive with active hydrogen groups. As used herein, the term "active hydrogen-containing, anionic salt group-containing resin" refers to resins that include active hydrogen functional groups and at least partially neutralized anionic groups. As used herein, the term "active hydrogen functional groups" refers to those groups that are reactive with isocyanates as determined by the Zerewitnoff test as is described in the JOURNAL OF THE AMERICAN CHEMICAL SOCIETY, Vol. 49, page 3181 (1927) and include, for example, hydroxyl groups, primary or secondary amine groups, and thiol groups. In certain embodiments, the active hydrogen functional groups are hydroxyl groups, primary amine groups and/or secondary amine groups.

Suitable curing agents for use in electrodepositable compositions comprising an active hydrogen-containing, anionic salt group-containing resin include, but are not necessarily limited to, aminoplast resins and phenolplast resins. Suitable aminoplast resins are condensation products of an aldehyde, e.g., formaldehyde, acetaldehyde, crotonaldehyde, and benzaldehyde and an amino or amido group containing material such as urea, melamine, and benzoguanamine. Products obtained from the reaction of alcohols and formaldehyde with melamine, urea and benzoguanamine are often used. Illustrative but non-limiting examples of useful aminoplast resins are those available under the trademark CYMEL from Cytec Industries and RESIMENE from Solutia Inc. Specific examples are CYMEL 1130 and 1156 and RESIMENE 750 and 753.

In other embodiments of the present invention, the ionic resin comprises a cationic salt group-containing resin. Suitable cationic salt-group containing resins include resins that contain at least partially neutralized cationic groups, such as sulfonium groups and amine groups, which impart a positive charge.

In certain embodiments, the cationic resin comprises a water-soluble cationic resin. In certain embodiments, the water-soluble cationic resin comprises a poly($C_{2-4}$)-alkyleneimine, which can be linear or branched, specific examples of which include polyethyleneimines (PEIs). As will be appreciated, PEIs are made by a ring opening polymerization of ethyleneamine. Other suitable water-soluble cationic resins include poly(allylamine hydrochloride), poly(acrylamide-co-diallyldimethylammonium chloride) and poly(2-methacryloxyethyltrimethylammonium chloride). In certain embodiments, the water soluble cationic resin, such as those mentioned above, has a weight average molecular weight of at least 5,000, such as at least 10,000, or, in some cases, 5,000 to 50,000, or, in some cases 10,000 to 25,000.

In certain embodiments, the water soluble cationic resin, such as a PEI, is present in an amount of at least 50 percent by weight, such as at least 60 percent by weight, at least 70 percent by weight, at least 80 percent by weight, or, in some cases, at least 90 percent by weight, based on the total weight of resin in the composition. In certain embodiments, the water soluble cationic resin, such as a PEI, is present in an amount of no more than 20 percent by weight, no more than 15 percent by weight, no more than 10 percent by weight, no more than 5 percent by weight, such as 1 to 20 percent by weight, 1 to 15 percent by weight, 5 to 15 percent by weight, or, in some cases, 1 to 3 percent by weight, based on the total weight of solids in the composition.

In certain embodiments, in addition to a water-soluble cationic resin, the composition also comprises a water dispersible cationic resin. Examples of water dispersible cationic resins that are suitable for use in the compositions described herein are active hydrogen-containing, cationic salt group-containing resins. As used herein, the term "active hydrogen-containing, cationic salt group-containing resin" refers to resins that include active hydrogen functional groups and at least partially neutralized cationic groups. Examples of resins that are suitable for use as the active hydrogen-containing, cationic salt group-containing resin in the present invention include, but are not limited to, alkyd resins, acrylics, polyepoxides, polyamides, polyurethanes, polyureas, polyethers, and polyesters, among others.

More specific examples of suitable active hydrogen-containing, cationic salt group containing resins include polyepoxide-amine adducts, such as the adduct of a polyglycidyl ethers of a polyphenol, such as Bisphenol A, and primary and/or secondary amines, such as are described in U.S. Pat. No. 4,031,050 at col. 3, line 27 to col. 5, line 50, U.S. Pat. No. 4,452,963 at col. 5, line 58 to col. 6, line 66, and U.S. Pat. No. 6,017,432 at col. 2, line 66 to col. 6, line 26, these portions of which being incorporated herein by reference. In certain embodiments, a portion of the amine that is reacted with the polyepoxide is a ketamine of a polyamine, as is described in U.S. Pat. No. 4,104,147 at col. 6, line 23 to col. 7, line 23, the cited portion of which being incorporated herein by reference. Also suitable are ungelled polyepoxide-polyoxyalkylenepolyamine resins, such as are described in U.S. Pat. No. 4,432,850 at col. 2, line 60 to col. 5, line 58, the cited portion of which being incorporated herein by reference. In addition, cationic acrylic resins, such as those described in U.S. Pat. No. 3,455,806 at col. 2, line 18 to col. 3, line 61 and U.S. Pat. No. 3,928,157 at col. 2, line 29 to col. 3, line 21, these portions of both of which being incorporated herein by reference, can be used.

Besides amine salt group-containing resins, quaternary ammonium salt group-containing resins can also be employed as a cationic salt group-containing resin in the compositions described herein. Examples of these resins are those which are formed from reacting an organic polyepoxide with a tertiary amine acid salt. Such resins are described in U.S. Pat. No. 3,962,165 at col. 2, line 3 to col. 11, line 7, U.S. Pat. No. 3,975,346 at col. 1, line 62 to col. 17, line 25, and U.S. Pat. No. 4,001,156 at col. 1, line 37 to col. 16, line 7, these portions of which being incorporated herein by reference. Examples of other suitable cationic resins include ternary sulfonium salt group-containing resins, such as those described in U.S. Pat. No. 3,793,278 at col. 1, line 32 to col. 5, line 20, this portion of which being incorporated herein by reference. Also, cationic resins which cure via a transesterification mechanism, such as described in European Patent Application No. 12463B1 at page 2, line 1 to page 6, line 25, this portion of which being incorporated herein by reference, can also be employed.

Other suitable cationic salt group-containing resins include those that may form photodegradation resistant electrodepositable coating compositions. Such resins include the resins comprising cationic amine salt groups which are derived from pendant and/or terminal amino groups that are disclosed in U.S. Patent Application Publication 2003/0054193 A1 at [0064] to [0088], this portion of which being incorporated herein by reference. Also suitable are the active hydrogen-containing, cationic salt group-containing resins derived from a polyglycidyl ether of a polyhydric phenol that is essentially free of aliphatic carbon atoms to which are bonded more than one aromatic group, which are described in U.S. Patent Application Publication 2003/0054193 A1 at [0096] to [0123], this portion of which being incorporated herein by reference.

In certain embodiments, the compositions comprise a cationic resin composition comprising a water soluble cationic resin, such as a PEI, and a water dispersible cationic resin, different from the PEI, wherein the water dispersible cationic resin is present in the composition in an amount of less than 50 percent by weight, such as less than 40 percent by weight, less than 30 percent by weight, less than 20 percent by weight, or, in some cases, less than 10 percent by weight, based on the total weight of cationic resin in the composition.

As will be appreciated, in adapting the cationic resin to be solubilized or dispersed in an aqueous medium, the resin is at least partially neutralized by, for example, treating with an acid. Non-limiting examples of suitable acids are inorganic acids, such as phosphoric acid and sulfamic acid, as well as organic acids, such as, acetic acid and lactic acid, among others. Besides acids, salts such as dimethylhydroxyethylammonium dihydrogenphosphate and ammonium dihydrogenphosphate can be used. In certain embodiments, the cationic resin is neutralized to the extent of at least 50 percent or, in some cases, at least 70 percent, of the total theoretical neutralization equivalent. The step of solubilization or dispersion may be accomplished by combining the neutralized or partially neutralized resin with the water.

In certain embodiments, the composition further includes a curing agent to react with the active hydrogen groups of the cationic salt group containing resin described above. Non-limiting examples of suitable curing agents are polyisocyanates, including at least partially blocked polyisocyanates, aminoplast resins and phenolic resins, such as phenolformaldehyde condensates including allyl ether derivatives thereof.

In certain embodiments, the composition may comprise a catalyst to catalyze the reaction between the curing agent and the active hydrogen-containing resin(s). Suitable cure catalysts include, without limitation, organotin compounds (e.g., dibutyltin oxide and dioctyltin oxide) and salts thereof (e.g., dibutyltin diacetate); other metal oxides (e.g., oxides of cerium, zirconium and bismuth) and salts thereof (e.g., bismuth sulfamate and bismuth lactate). In certain embodiments, the cure catalyst comprises a cyclic guanidine as described in U.S. Pat. No. 7,842,762 at col. 1, line 53 to col. 4, line 18 and col. 16, line 62 to col. 19, line 8, the cited portions of which being incorporated herein by reference. In some embodiments, the compositions do not include an organotin compound.

The compositions used in the methods of the present invention further comprise solid particles. As used herein, the term "solid particles" refers to discrete three-dimensional shaped solids which are chemically different from the ionic resin(s). The shape (or morphology) of the particles can vary. For example, sheet or plate-like graphenic carbon particles as described below may be used. In addition, solid particles having generally spherical morphologies (such as solid beads, microbeads, or hollow spheres), and particles that are cubic or acicular (elongated or fibrous) may be used. When plate-like particles are used, they may be planar, or at least a portion may be curved, curled, creased or buckled. Additionally, in certain embodiments, the additional particles can have an internal structure that is hollow, porous or void free, or a combination of any of the foregoing, e.g., a hollow center with porous or solid walls. For more information on suitable particle characteristics see H. Katz et al. (Ed.), Handbook of Fillers and Plastics (1987) at pages 9-10.

In certain embodiments, the solid particles comprise graphenic carbon particles. The graphenic carbon particles may be provided in the electrodepositable compositions in any suitable amount. For example, the weight ratio of the graphenic carbon particles to the ionic resin in the compositions may typically range from 0.05:1 to 5:1. In certain embodiments, the weight ratio of graphenic carbon particles to ionic resin may range from 0.1:1 to 2:1, or from 0.1:1 to 1:1.

As used herein, the term "graphenic carbon particles" means carbon particles having structures comprising one or more layers of one-atom-thick planar sheets of $sp^2$-bonded carbon atoms that are densely packed in a honeycomb crystal lattice. The average number of stacked layers may be less than 100, for example, less than 50. In certain embodiments, the average number of stacked layers is 30 or less, such as 20 or less, 10 or less, or, in some cases, 5 or less. The graphenic carbon particles may be substantially flat, however, at least a portion of the planar sheets may be substantially curved, curled, creased or buckled. The particles typically do not have a spheroidal or equiaxed morphology.

In certain embodiments, the graphenic carbon particles have a thickness, measured in a direction perpendicular to the carbon atom layers, of no more than 10 nanometers, no more than 5 nanometers, or, in certain embodiments, no more than 4 or 3 or 2 or 1 nanometers, such as no more than 3.6 nanometers. In certain embodiments, the graphenic carbon particles may be from 1 atom layer up to 3, 6, 9, 12, 20 or 30 atom layers thick, or more. In certain embodiments, the graphenic carbon particles have a width and length, measured in a direction parallel to the carbon atoms layers, of at least 50 nanometers, such as more than 100 nanometers, in some cases more than 100 nanometers up to 500 nanometers, or more than 100 nanometers up to 200 nanometers. The graphenic carbon particles may be provided in the form of ultrathin flakes, platelets or sheets having relatively high aspect ratios (aspect ratio being defined as the ratio of the longest dimension of a particle to the shortest dimension of the particle) of greater than 3:1, such as greater than 10:1.

In certain embodiments, the graphenic carbon particles have relatively low oxygen content. For example, the graphenic carbon particles may, even when having a thickness of no more than 5 or no more than 2 nanometers, have an oxygen content of no more than 2 atomic weight percent, such as no more than 1.5 or 1 atomic weight percent, or no more than 0.6 atomic weight, such as about 0.5 atomic weight percent. The oxygen content of the graphenic carbon particles can be determined using X-ray Photoelectron Spectroscopy, such as is described in D. R. Dreyer et al., Chem. Soc. Rev. 39, 228-240 (2010).

In certain embodiments, the graphenic carbon particles have a B.E.T. specific surface area of at least 50 square meters per gram, such as 70 to 1000 square meters per gram, or, in some cases, 200 to 1000 square meters per grams or 200 to 400 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938).

In certain embodiments, the graphenic carbon particles have a Raman spectroscopy 2D/G peak ratio of at least 1:1, for example, at least 1.2:1 or 1.3:1. As used herein, the term "2D/G peak ratio" refers to the ratio of the intensity of the 2D peak at 2692 $cm^{-1}$ to the intensity of the G peak at 1,580 $cm^{-1}$.

In certain embodiments, the graphenic carbon particles have a relatively low bulk density. For example, the graphenic carbon particles are characterized by having a bulk density (tap density) of less than 0.2 $g/cm^3$, such as no more than 0.1 $g/cm^3$. For the purposes of the present invention, the bulk density of the graphenic carbon particles is determined by placing 0.4 grams of the graphenic carbon particles in a glass measuring cylinder having a readable scale. The cylinder is raised approximately one inch and tapped 100 times, by striking the base of the cylinder onto a hard surface, to allow the graphenic carbon particles to settle within the cylinder. The volume of the particles is then measured, and the bulk density is calculated by dividing 0.4 grams by the measured volume, wherein the bulk density is expressed in terms of $g/cm^3$.

In certain embodiments, the graphenic carbon particles have a compressed density and a percent densification that is less than the compressed density and percent densification of graphite powder and certain types of substantially flat graphenic carbon particles such as those formed from exfoliated graphite. Lower compressed density and lower percent densification are each currently believed to contribute to better dispersion and/or rheological properties than graphenic carbon particles exhibiting higher compressed density and higher percent densification. In certain embodiments, the compressed density of the graphenic carbon particles is 0.9 or less, such as less than 0.8, less than 0.7, such as from 0.6 to 0.7. In certain embodiments, the percent densification of the graphenic carbon particles is less than 40%, such as less than 30%, such as from 25 to 30%.

For purposes of the present invention, the compressed density of graphenic carbon particles is calculated from a measured thickness of a given mass of the particles after compression. Specifically, the measured thickness is determined by subjecting 0.1 grams of the graphenic carbon particles to cold press under 15,000 pound of force in a 1.3-centimeter die for 45 minutes, wherein the contact pressure is 500 MPa. The compressed density of the graphenic carbon particles is then calculated from this measured thickness according to the following equation:

$$\text{Compressed Density (g/cm}^3) = \frac{0.1 \text{ grams}}{\prod *(1.3 \text{ cm}/2)^2 *(\text{measured thickness in cm})}$$

The percent densification of the graphenic carbon particles is then determined as the ratio of the calculated compressed density of the graphenic carbon particles, as determined above, to 2.2 g/cm³, which is the density of graphite.

In certain embodiments, the graphenic carbon particles have a measured bulk liquid conductivity of at least 100 microSiemens, such as at least 120 microSiemens, such as at least 140 microSiemens immediately after mixing and at later points in time, such as at 10 minutes, or 20 minutes, or 30 minutes, or 40 minutes. For the purposes of the present invention, the bulk liquid conductivity of the graphenic carbon particles is determined as follows. First, a sample comprising a 0.5% solution of graphenic carbon particles in butyl cellosolve is sonicated for 30 minutes with a bath sonicator. Immediately following sonication, the sample is placed in a standard calibrated electrolytic conductivity cell (K=1). A Fisher Scientific AB 30 conductivity meter is introduced to the sample to measure the conductivity of the sample. The conductivity is plotted over the course of about 40 minutes.

In accordance with certain embodiments, percolation, defined as long range interconnectivity, occurs between the conductive graphenic carbon particles. Such percolation may reduce the resistivity of the coating compositions. The conductive graphenic particles may occupy a minimum volume within the coating such that the particles form a continuous, or nearly continuous, network. In such a case, the aspect ratios of the graphenic carbon particles may affect the minimum volume required for percolation.

In certain embodiments, at least a portion of the graphenic carbon particles may be made by thermal processes. In accordance with embodiments of the invention, thermally produced graphenic carbon particles are made from carbon-containing precursor materials that are heated to high temperatures in a thermal zone such as a plasma. As more fully described below, the carbon-containing precursor materials are heated to a sufficiently high temperature, e.g., above 3,500° C., to produce graphenic carbon particles having characteristics as described above. The carbon-containing precursor, such as a hydrocarbon provided in gaseous or liquid form, is heated in the thermal zone to produce the graphenic carbon particles in the thermal zone or downstream therefrom. For example, thermally produced graphenic carbon particles may be made by the systems and methods disclosed in U.S. Pat. Nos. 8,486,363 and 8,486,364.

In certain embodiments, the thermally produced graphenic carbon particles may be made by using the apparatus and method described in U.S. Pat. No. 8,486,363 at [0022] to [0048] in which (i) one or more hydrocarbon precursor materials capable of forming a two-carbon fragment species (such as n-propanol, ethane, ethylene, acetylene, vinyl chloride, 1,2-dichloroethane, allyl alcohol, propionaldehyde, and/or vinyl bromide) is introduced into a thermal zone (such as a plasma), and (ii) the hydrocarbon is heated in the thermal zone to form the graphenic carbon particles. In other embodiments, the thermally produced graphenic carbon particles may be made by using the apparatus and method described in U.S. Pat. No. 8,486,364 at [0015] to [0042] in which (i) a methane precursor material (such as a material comprising at least 50 percent methane, or, in some cases, gaseous or liquid methane of at least 95 or 99 percent purity or higher) is introduced into a thermal zone (such as a plasma), and (ii) the methane precursor is heated in the thermal zone to form the graphenic carbon particles. Such methods can produce graphenic carbon particles having at least some, in some cases all, of the characteristics described above.

During production of the graphenic carbon particles by the thermal production methods described above, a carbon-containing precursor is provided as a feed material that may be contacted with an inert carrier gas. The carbon-containing precursor material may be heated in a thermal zone, for example, by a plasma system. In certain embodiments, the precursor material is heated to a temperature of at least 3,500° C., for example, from a temperature of greater than 3,500° C. or 4,000° C. up to 10,000° C. or 20,000° C. Although the thermal zone may be generated by a plasma system, it is to be understood that any other suitable heating system may be used to create the thermal zone, such as various types of furnaces including electrically heated tube furnaces and the like.

The gaseous stream may be contacted with one or more quench streams that are injected into the plasma chamber through at least one quench stream injection port. The quench stream may cool the gaseous stream to facilitate the formation or control the particle size or morphology of the graphenic carbon particles. In certain embodiments of the invention, after contacting the gaseous product stream with the quench streams, the ultrafine particles may be passed through a converging member. After the graphenic carbon particles exit the plasma system, they may be collected. Any suitable means may be used to separate the graphenic carbon particles from the gas flow, such as, for example, a bag filter, cyclone separator or deposition on a substrate.

In certain embodiments, at least a portion of the graphenic carbon particles may be obtained from commercial sources, for example, from Angstron, XG Sciences and other commercial sources. In such embodiments, the commercially available graphenic carbon particles may comprise exfoliated graphite and have different characteristics in comparison with the thermally produced graphenic carbon particles, such as different size distributions, thicknesses, aspect ratios, structural morphologies, oxygen contents, and chemical functionalities at the basal planes/edges.

In certain embodiments, the graphenic carbon particles are functionalized. As used herein, "functionalized", when referring to graphenic carbon particles, means covalent bonding of any non-carbon atom or any organic group to the graphenic carbon particles. The graphenic carbon particles may be functionalized through the formation of covalent bonds between the carbon atoms of a particle and other chemical moieties such as carboxylic acid groups, sulfonic acid groups, hydroxyl groups, halogen atoms, nitro groups, amine groups, aliphatic hydrocarbon groups, phenyl groups and the like. For example, functionalization with carbonaceous materials may result in the formation of carboxylic acid groups on the graphenic carbon particles. The graphenic carbon particles may also be functionalized by other reactions such as Diels-Alder addition reactions, 1,3-dipolar cycloaddition reactions, free radical addition reactions and diazonium addition reactions. In certain embodiments, the hydrocarbon and phenyl groups may be further functionalized. If the graphenic carbon particles already have some hydroxyl functionality, the functionality can be modified and extended by reacting these groups with, for example, an organic isocyanate.

In certain embodiments, different types of graphenic carbon particles may be used in the electrodepositable composition. For example, when thermally produced graphenic carbon particles are combined with commercially available graphenic carbon particles in accordance with embodiments of the invention, a bi-modal distribution, tri-modal distribution, etc. of graphenic carbon particle characteristics may be achieved. The graphenic carbon particles contained in the compositions may have multi-modal particle size distributions, aspect ratio distributions, structural morphologies, edge functionality differences, oxygen content, and the like.

In an embodiment of the present invention in which both thermally produced graphenic carbon particles and commercially available graphenic carbon particles, e.g., from exfoliated graphite, are used to produce a bi-modal graphenic particle size distribution, the relative amounts of the different types of graphenic carbon particles are controlled to produce desired conductivity properties of the coatings. For example, the thermally produced graphenic particles may comprise from 1 to 50 weight percent, and the commercially available graphenic carbon particles may comprise from 50 to 99 weight percent, based on the total weight of the graphenic carbon particles. In certain embodiments, the thermally produced graphenic carbon particles may comprise from 2 or 4 to 40 weight percent, or from 6 or 8 to 35 weight percent, or from 10 to 30 weight percent. When co-dispersions of the present invention having such relative amounts of thermally produced graphenic carbon particles and commercially available graphenic carbon particles are incorporated in coatings, inks, or other materials, such materials may exhibit significantly increased electrical conductivities in comparison with similar materials containing mixtures of such types of graphenic carbon particles at similar ratios. For example, the co-dispersions may increase electrical conductivity by at least 10 or 20 percent compared with the mixtures. In certain embodiments, the electrical conductivity may be increased by at least 50, 70 or 90 percent, or more.

In certain embodiments of the present invention, in addition to the graphenic carbon particles, the solid particles also comprise lithium-containing particles, such as, mixed metal oxides comprising Li and at least one element selected from Ni, Co, Fe, Mn, Al and P. For example, the lithium-containing particles may include $LiCoO_2$, $LiNiO_2$, $LiFePO_4$, $LiCoPO_4$, $LiMnO_2$, $LiMn_2O_4$, $Li(NiMnCo)O_2$, and/or $Li(NiCoAl)O_2$, wherein the relative amounts of the transition metals may be varied as desired. For example, Ni, Mn and Co may not be always in a relative atomic ratio of 1:1:1 and may contain more nickel such as 5:3:2 or 8:2:2 in some embodiments. In certain embodiments, such lithium-containing particles have an average particle size, prior to incorporation into the composition, of no more than 10 micron, no more than 5 micron, no more than 3 micron, no more than 1 micron, such as 10 nanometers to 1,000 nanometers, or, in some cases 500 nanometers to 1,000 nanometers or 600 nanometers to 800 nanometers.

In certain embodiments, such lithium-containing solid particles are present in an amount of at least 50 percent by weight, at least 60 percent by weight, at least 70 percent by weight, at least 80 percent by weight, such as at least 85 percent by weight, or, in some cases, at least 90, 93 or 96 percent by weight, based on the total weight of solids in the composition. In accordance with certain embodiments in which the solid particles comprise lithium-containing particles and graphenic carbon particles, their relative weight percentages based on the total combined weight of the lithium-containing particles and graphenic carbon particles typically range from 85 to 99.5 weight percent lithium-containing particles and from 0.5 to 15 weight percent graphenic carbon particles, for example, from 90 to 99 weight percent lithium-containing particles and from 1 to 10 weight percent graphenic carbon particles, or from 92 to 98 weight percent lithium-containing particles and from 2 to 8 weight percent graphenic carbon particles.

In certain embodiments, including those embodiments mentioned above in which the solid particles comprise graphenic carbon particles and lithium containing particles, the compositions may comprise additional electrically conductive particles, such as electrically conductive carbon particles. Suitable electrically conductive particles include electrically conductive carbon blacks, acetylene blacks, carbon nano tubes, carbon fibers, fullerenes and the like. Examples of commercially available electrically conductive carbon blacks, that are suitable for use herein, include, but are not limited to, Cabot Monarch™ 1300, Cabot XC-72R, Cabot LiTX 50, Cabot LiTX 200, Cabot LiTX 300, Denka Black HS-100L, Black Pearls 2000 and Vulcan XC 72 sold by Cabot Corporation; Acheson Electrodag™ 230 sold by Acheson Colloids Co.; Columbian Raven™ 3500 sold by Columbian Carbon Co.; and Printex™ XE 2, Printex 200, Printex L and Printex L6 sold by DeGussa Corporation, Pigments Group, and Super P® and Super P® Li, C-Nergy™ Super C45 and C-Nergy™ Super C65 sold by TIMCAL Ltd. In certain embodiments, the electrically conductive carbon black used in the compositions described herein has an average primary particle size, prior to incorporation into the composition, of less than 300 nanometers, such as 1 to 200 nanometers, 10 to 100 nanometers, or, in some cases, 30 to 50 nanometers.

Other electrically conductive particles that are suitable for use in the present invention include, but are not limited to, electrically conductive silica, such as AEROSIL 200 sold by Japan Aerosil Co., Ltd., and SYLOID® 161, SYLOID® 244, SYLOID® 308, SYLOID® 404 and SYLOID® 978 all available from Fuji Davison Co., Ltd., metal powders, such as aluminum, copper or special steel, molybdenum disulphide, iron oxide, e.g., black iron oxide, antimony-doped titanium dioxide and nickel doped titanium dioxide. Also suitable are particles coated with metals such as cobalt, copper, nickel, iron, tin, zinc, and combinations of thereof. Suitable particles which can be coated with the aforementioned metals include alumina, aluminum, aromatic polyester, boron nitride, chromium, graphite, iron, molybdenum, neodymium/iron/boron, samarium cobalt, silicon carbide, stainless steel, titanium diboride, tungsten, tungsten carbide, and zirconia particles. Such metal-coated particles are commercially available from Advanced Ceramics Corp. Other metal-coated particles which may be used include ceramic micro-balloons, chopped glass fibers, graphite powder and flake, boron nitride, mica flake, copper powder and flake, nickel powder and flake, aluminum coated with metals such as carbon, copper, nickel, palladium, silicon, silver and titanium coatings. These particles are typically metal coated using fluidized bed chemical vacuum deposition techniques. Such metal-coated particles are commercially available from Powdermet, Inc. Mixtures of different electrically conductive particles can be used.

In certain embodiments, the electrically conductive particles are present in the composition in an amount such that the relative weight ratio of lithium-containing particles to the graphenic carbon particles or other electrically conductive particles in the composition is at least 3:1, at least 4:1, at least 5:1, at least 8:1, at least 10:1, or, in some cases, at least 15:1, or at least 30:1, or at least 45:1, or at least 60:1. In certain embodiments, such electrically conductive particles are present in an amount of no more than 20 percent by weight, no more than 10 percent by weight, such as 1 to 10 percent by weight, or 1 to 5 percent by weight, based on the total weight of the solids in the composition.

In addition to the graphenic carbon particles described above, other types of solid particles may be included in the electrodepositable materials. Such solid particles can be polymeric and/or non-polymeric inorganic materials, polymeric and/or non-polymeric organic materials, composite materials, as well as mixtures of any of the foregoing. As used herein, the term "polymer" is meant to encompass oligomers, and includes without limitation both homopolymers and copolymers.

As used herein, the term "polymeric inorganic material" means a polymeric material having a backbone repeat unit based on an element or elements other than carbon. Moreover, as used herein, the term "polymeric organic materials" means synthetic polymeric materials, semi-synthetic polymeric materials and natural polymeric materials, all of which have a backbone repeat unit based on carbon.

The term "organic material", as used herein, means carbon containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example calcium carbonate and sodium carbonate. As used herein, the term "inorganic material" means any material that is not an organic material.

As used herein, the term "composite material" means a combination of two or more differing materials. The particles formed from composite materials may have a hardness at their surface that is different from the hardness of the internal portions of the particle beneath its surface. More specifically, the surface of the particle can be modified in any manner well known in the art, including, but not limited to, chemically or physically changing its surface characteristics using techniques known in the art.

For example, a particle can be formed from a primary material that is coated, clad or encapsulated with one or more secondary materials to form a composite particle that has a softer surface. In certain embodiments, particles formed from composite materials can be formed from a primary material that is coated, clad or encapsulated with a different form of the primary material.

As indicated, the solid particles can include any of a variety of inorganic materials, such as ceramic materials, metallic materials, and mixtures of any of the foregoing. Non-limiting examples of such ceramic materials can comprise metal oxides, mixed metal oxides, metal nitrides, metal carbides, metal sulfides, metal silicates, metal borides, metal carbonates, and mixtures of any of the foregoing. A specific, non-limiting example of a metal nitride is boron nitride; a specific, non-limiting example of a metal oxide is zinc oxide; non-limiting examples of suitable mixed metal oxides are aluminum silicates and magnesium silicates; non-limiting examples of suitable metal sulfides are molybdenum disulfide, tantalum disulfide, tungsten disulfide, and zinc sulfide; non-limiting examples of metal silicates are aluminum silicates and magnesium silicates, such as vermiculite.

In certain embodiments of the present invention, the solid particles comprise inorganic materials selected from aluminum, barium, bismuth, boron, cadmium, calcium, cerium, cobalt, copper, iron, lanthanum, magnesium, manganese, molybdenum, phosphorus, selenium, silicon, silver, sulfur, tin, titanium, tungsten, vanadium, yttrium, zinc, and zirconium, including oxides thereof, nitrides thereof, phosphides thereof; phosphates thereof, selenides thereof; sulfides thereof; sulfates thereof; and mixtures thereof. Suitable non-limiting examples of the foregoing inorganic particles include alumina, silica, titania, cera, zirconia, bismuth oxide, magnesium oxide, iron oxide, aluminum silicate, boron carbide, nitrogen doped titania, and cadmium selenide.

In certain embodiments, the solid particles used in the present invention have a lamellar structure. Particles having a lamellar structure are composed of sheets or plates of atoms or particles in a hexagonal array. A non-limiting example of a lamellar structure is a hexagonal crystal structure. Inorganic solid particles having a lamellar fullerene (buckyball) structure are also useful.

Non-limiting examples of suitable materials having a lamellar structure include boron nitride, graphite, metal dichalcogenides, mica, talc, gypsum, kaolinite, calcite, cadmium iodide, silver sulfide and mixtures thereof. Suitable metal dichalcogenides include molybdenum disulfide, molybdenum disclenide, tantalum disulfide, tantalum diselenide, tungsten disulfide, tungsten diselenide and mixtures thereof.

The solid particles can be formed from non-polymeric, organic material. Non-limiting examples of non-polymeric, organic materials useful in the present invention include, but are not limited to, stearates (such as zinc stearate and aluminum stearate), diamond, carbon black and stearamide.

In certain embodiments, the solid particles comprise an organic pigment, such as for example, azo compounds (monoazo, di-azo, β-Naphthol, Naphthol AS, azo pigment lakes, benzimidazolone, di-azo condensation, metal complex, isoindolinone, isoindoline), and polycyclic (phthalocyaninc, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone) pigments, and mixtures of any of the foregoing.

In certain embodiments, the additional solid particles described above have an average particle size of less than 100 microns prior to incorporation into the composition, such as less than 50 microns prior to incorporation into the composition. In certain embodiments, the solid particles have an average particle size ranging from 1 to 10,000 nanometers prior to incorporation into the composition, 1 to 1000 nanometers prior to incorporation into the composition, or 1 to 100 nanometers prior to incorporation into the composition.

In those embodiments where the average particle size of the solid particles is at least about one micron, the average particle size can be measured according to known laser scattering techniques. For example the average particle size of such particles can be measured using a Horiba Model LA 900 laser diffraction particle size instrument, which uses a helium-neon laser with a wave length of 633 nm to measure the size of the particles and assumes the particle has a spherical shape, i.e., the "particle size" refers to the smallest sphere that will completely enclose the particle.

In those embodiments where the average particle size of the solid particles is less than or equal to one micron, the average particle size can be determined by visually examining an electron micrograph of a transmission electron microscopy ("TEM") image, measuring the diameter of the particles in the image, and calculating the average particle size based on the magnification of the TEM image. One of ordinary skill in the art will understand how to prepare such a TEM image. The diameter of the particle refers to the smallest diameter sphere that will completely enclose the particle.

In certain embodiments, the composition may include other typical ingredients, such as corrosion inhibitors, antioxidants, flow control agents, surfactants and the like.

The electrodepositable compositions described above can be prepared in any desired manner, including the methods described in the Examples. For example, in some embodiments, it may be desirable to incorporate the solid particles by means of a composition in which the solid particles are mixed with a water soluble ionic resin that has been pre-solubilized in an aqueous medium. Exemplary ionic resins suitable for this purpose include the water-soluble resins mentioned above. The solids content of such a composition may be relatively high, such as 2 times, 3 times, or 4 times or more the total solids content of the composition in the methods of the present invention. The composition may be mixed, such as by sonification, to provide a uniform dispersion. This sonication may take 15 to 30 minutes or more. The resulting composition may then subsequently be combined with further liquid carrier, i.e., water and optionally organic solvent, to provide the final composition for use in the methods of the present invention.

In certain embodiments of the methods of the present invention, the substrate is immersed in a composition that has a weight ratio of solid particles to ionic resin of at least 4:1, such as at least 5:1, at least 6:1, at least 7:1, at least 8:1, at least 9:1, at least 10:1, at least 11:1, at least 12:1, at least 13:1, at least 14:1, at least 15:1, at least 16:1, at least 17:1, or higher. The solid particles may comprise from 0.05 to 100 weight percent graphenic carbon particles, for example, from 0.1 to 10 weight percent, or from 0.1 to 5 weight percent.

Moreover, in certain embodiments of the methods of the present invention, the substrate is immersed in a composition that has a total solids content of 0.5 to 25 percent by weight, such as 1 to 10 percent by weight, or, in some cases, 1 to 5 percent by weight, based on the total weight of the composition. Indeed, it has been discovered that such compositions can be provide stable dispersions of the solid particles and ionic resin in an aqueous medium, even without the use of a thickener. As used herein, the term "stable dispersion" refers to a dispersion that does not gel, flocculate or precipitate when maintained at a temperature of 25° C. for at least 60 days, or, if some precipitation does occur, the precipitate can be re-dispersed upon agitation.

Moreover, it has been discovered that when such compositions are used in the methods of the present invention, even when the weight ratio of solid particles to ionic resin in the bath is within the foregoing ranges, a solid uniform coating of a suitable film thickness and acceptable porosity can be provided, which may make the foregoing methods particularly suitable for manufacturing coated substrates that may be used as a cathode for a lithium ion battery.

In the methods of the present invention, a coating is applied onto or over at least a portion of the substrate via an electrodeposition process. In such a process, an electrically conductive substrate (such as any of those described earlier) serving as an electrode (such as an anode in anionic electrodeposition) in an electrical circuit comprising the electrode and a counter-electrode (such as a cathode in anionic electrodeposition), is immersed a composition of the type described above. An electric current is passed between the electrodes to cause the coating to deposit on the substrate. The applied voltage may be varied and can be, for example, as low as one volt to as high as several thousand volts but is often between 50 and 500 volts. The current density is often between 0.5 ampere and 15 amperes per square foot. In certain embodiments, the residence time of the substrate in the composition is from 30 to 180 seconds.

After electrocoating, the substrate is removed from the bath and may, in certain embodiments and depending upon the particulars of the composition and the preferences of the end user, be baked in an oven. For example, the coated substrate may be baked at temperatures of 225° F. or lower, such as 200° F. or lower for 10 to 60 minutes. In other cases, after electrocoating and removal of the substrate from the bath (and again depending upon the particulars of the bath composition and the preferences of the end user), the coated substrate may simply be allowed to dry under ambient conditions. As used herein, "ambient conditions" refers to atmospheric air having a relative humidity of 10 to 100 percent and a temperature in the range of −10 to 120° C., such as 5 to 80° C., in some cases 10 to 60° C. and, in yet other cases, 15 to 40° C.

As will be appreciated from the foregoing description, in some respects, the present invention is directed to methods comprising: immersing an electrically conductive substrate into an electrodepositable composition, the substrate serving as an electrode in an electrical circuit comprising the electrode and a counter-electrode immersed in the composition, a coating being applied onto or over at least a portion of the substrate as electric current is passed between the electrodes, the electrodepositable composition comprising: (a) an aqueous medium; (b) an ionic resin; and (c) solid particles comprising graphenic carbon particles, wherein the composition has a weight ratio of solid particles to ionic resin of at least 4:1. The present invention is also directed to any method set forth in this paragraph, wherein the substrate is a foil comprising aluminum, iron, copper, manganese, nickel, a combination thereof, and/or an alloy thereof, wherein any of these foils may have a thickness of no more than 8 mils (203.2 μm), such as no more than 4 mils (101.6 μm), no more than 2 mils (50.8 μm), or, in some cases no more than 1 mil (25.4 μm), and/or at least 0.1 mil (2.54 μm), such as at least 0.2 mil (5.08 μm), at least 0.4 mils (10.2 μm), or at least 0.5 mil (12.7 μm). The present invention is also directed to any method set forth in this paragraph, wherein the aqueous medium either consists exclusively of water or comprises predominantly water in combination with inert organic cosolvent(s), such as organic cosolvents that are at least partially soluble with water, such as oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols and alcohols, such as ethanol, isopropanol, butanol and diacetone alcohol. The present invention is also directed to any method set forth in this paragraph, wherein an organic cosolvent is present in an amount of less than 25 percent by weight, less than 20 percent by weight, or, in some cases, less than 10 percent by weight, such as less than 5 percent by weight, based on total weight of water in the electrodepositable composition. The present invention is also directed to any method set forth in this paragraph, wherein the aqueous medium is present in the electrodepositable composition in an amount of at least 75 percent by weight, at least 90 percent by weight, or at least 95 percent by weight, such as 75 to 99.5 percent by weight, 90 to 99 percent by weight, or, in some cases, 95 to 99 percent by weight, based on the total weight of the composition. The present invention is also directed to any method set forth in this paragraph, wherein the ionic resin comprises an anionic resin, such as a base-neutralized, carboxylic acid group-containing resin, such as where the base-neutralized, carboxylic acid group-containing resin is water soluble, such as where the water soluble resin comprises a cellulose derivative, such as an alkali salt of a carboxymethylcellulose, such as a carboxymethylcellulose having a weight average molecular weight of at least 50,000, at least 100,000, at least 200,000, such as 50,000 to 1,000,000, 100,000 to 500,000 or 200,000 to 300,000. The present invention is also directed to any method set forth in this paragraph, wherein a water soluble resin is present in the composition in an amount of at least 50 percent by weight, such as at least 60 percent by weight, at least 70 percent by weight, at least 80 percent by weight, or at least 90 percent by weight, the weight percent being based on the total weight of resin in the composition. The present invention is also directed to any method set forth in this paragraph, wherein a water soluble resin is present in the composition in an amount of no more than 20 percent by weight, such as no more than 15 percent by weight, no more than 10 percent by weight, no more than 5 percent by weight, such as 1 to 20 percent by weight, 1 to 15 percent by weight, 5 to 15 percent by weight, or 1 to 3 percent by weight, the weight percent being based on the total weight of solids in the composition. The present invention is also directed to any method set forth in this paragraph, wherein the solid particles comprise lithium-containing particles, such as lithium-containing particles comprising mixed metal oxides comprising Li and at least one element selected from Ni, Co, Fe, Mn, Al and P. For example, the lithium-containing particles may include $LiCoO_2$, $LiMO_2$, $LiFePO_4$, $LiCoPO_4$, $LiMnO_2$, $LiMn_2O_4$, $Li(NiMnCo)O_2$, and/or $Li(NiCoAl)O_2$, wherein the relative amounts of the transition metals may be varied as desired. For example, Ni, Mn and Co may not be always in a relative atomic ratio of 1:1:1 and may contain more nickel such as 5:3:2 or 8:2:2. The present invention is also directed to any method set forth in this paragraph, wherein lithium-containing particles are present in an amount of at least 50 percent by weight, at least 60 percent by weight, at least 70 percent by weight, at least 80 percent by weight, at least 85 percent by weight, or at least 90 percent by weight, based on the total weight of the solids in the composition. The present invention is also directed to any method set forth in this paragraph, wherein the solid particles comprise electrically conductive particles, such as graphenic carbon particles, or graphenic carbon particles in combination with other electrically conductive carbon particles, such as electrically conductive carbon black. The present invention is also directed to any method set forth in this paragraph, wherein a relative weight ratio of lithium-containing particles to electrically conductive graphenic carbon particles in the composition is at least 3:1, at least 4:1, at least 5:1, at least 8:1, at least 10:1, or at least 15:1, or at least 30:1, or at least 45:1, or at least 60:1. The present invention is also directed to any method set forth in this paragraph, wherein electrically conductive graphenic carbon particles are present in an amount of no more than 20 percent by weight, no more than 10 percent by weight, such as 1 to 10 percent by weight or 1 to 5 percent by weight, based on the total weight of the solids in the composition. The present invention is also directed to any method set forth in this paragraph, wherein the electrodepositable composition has a weight ratio of solid particles to ionic resin of at least 5:1, at least 6:1, at least 7:1, at least 8:1, at least 9:1, at least 10:1, at least 11:1, at least 12:1, at least 13:1, at least 14:1, at least 15:1, at least 16:1, or at least 17:1. For example, the weight ratio of solid particles to ionic resin may be at least 45:1, or at least 60:1. The present invention is also directed to any method set forth in this paragraph, wherein the electrodepositable composition has a total solids content of 0.5 to 25 percent by weight, such as 1 to 10 percent by weight, such as 1 to 5 percent by weight, based on the total weight of the composition.

As will also be appreciated by the foregoing description, in some respects, the present invention is also directed to electrodepositable compositions comprising: (a) an aqueous medium; (b) an ionic resin; and (c) solid particles comprising: (i) graphenic carbon particles, and (ii) lithium-containing particles, wherein the composition has a weight ratio of solid particles to ionic resin of at least 4:1. The present invention is also directed to any electrodepositable composition set forth in this paragraph, wherein the composition has a weight ratio of solid particles to ionic resin of at least 4:1, at least 5:1, at least 6:1, at least 7:1, at least 8:1, at least 9:1, at least 10:1, at least 11:1, at least 12:1, at least 13:1, at least 14:1, at least 15:1, at least 16:1, or at least 17:1, or at least 45:1, or at least 60:1. The present invention is also directed to any electrodepositable composition set forth in this paragraph, wherein the aqueous medium either consists exclusively of water or comprises predominantly water in combination with inert organic cosolvent(s), such as organic cosolvents that are at least partially soluble with water, such as oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols and alcohols, such as ethanol, isopropanol, butanol and diacetone alcohol. Other at least partially water-miscible solvents may include coalescing solvents such as triethyl phosphate, triacetin, dipropylene diacetate, and the like. The present invention is also directed to any electrodepositable composition set forth in this paragraph, wherein an organic cosolvent is present in an amount of less than 25 percent by weight, less than 20 percent by weight, or, in some cases, less than 10 percent by weight, such as less than 5 percent by weight, based on total weight of water in the electrodepositable composition. The present invention is also directed to any electrodepositable composition set forth in this paragraph, wherein the aqueous medium is present in the electrodepositable composition in an amount of at least 75 percent by weight, at least 90 percent by weight, or at least 95 percent by weight, such as 75 to 99.5 percent by weight, 90 to 99 percent by weight, or, in some cases, 95 to 99 percent by weight, based on the total weight of the composition. The present invention is also directed to any electrodepositable composition set forth in this paragraph, wherein the ionic resin comprises an anionic resin, such as a base-neutralized, carboxylic acid group-containing resin, such as where the base-neutralized, carboxylic acid group-containing resin is water soluble, such as where the water soluble resin comprises a cellulose derivative, such as an alkali salt of a carboxymethylcellulose, such as a carboxymethylcellulose having a weight average molecular weight of at least 50,000, at least 100,000, at least 200,000, such as 50,000 to 1,000,000, 100,000 to 500,000 or 200,000 to 300,000. The present invention is also directed to any electrodepositable composition set forth in this paragraph, wherein a water soluble resin is present in the composition in an amount of at least 50 percent by weight, such as at least 60 percent by weight, at least 70 percent by weight, at least 80 percent by weight, or at least 90 percent by weight, the weight percent being based on the total weight of resin in the composition. The present invention is also directed to any electrodepositable composition set forth in this paragraph, wherein a water soluble resin is present in the composition in an amount of no more than 20 percent by weight, has no more than 15 percent by weight, no more than 10 percent by weight, no more than 5 percent by weight, such as 1 to 20 percent by weight, 1 to 15 percent by weight, 5 to 15 percent by weight, or 1 to 3 percent by weight, the weight percent being based on the total weight of solids in the composition. The present invention is also directed to any electrodepositable composition set forth in this paragraph, wherein the lithium-containing particles comprise mixed metal oxides comprising Li and at least one element selected from Ni, Co, Fe, Mn, Al and P. For example, the lithium-containing particles may include $LiCoO_2$, $LiNiO_2$, $LiFePO_4$, $LiCoPO_4$, $LiMnO_2$, $LiMn_2O_4$, $Li(NiMnCo)O_2$, and/or $Li(NiCoAl)O_2$, wherein the relative amounts of the transition metals may be varied as desired. For example, Ni, Mn, and Co may not be always in a ratio of 1:1:1 or 3:3:3 and may contain more nickel such as 5:3:2 or as high as 8:2:2. The present invention is also directed to any electrodepositable composition set forth in this paragraph, wherein lithium-containing particles are present in an amount of at least 50 percent by weight, at least 60 percent by weight, at least 70 percent by weight, at least 80 percent by weight, at least 85 percent by weight, or at least 90 percent by weight, based on the total weight of the solids in the composition. The present invention is also directed to any electrodepositable composition set forth in this paragraph, wherein a relative weight ratio of lithium-containing particles to graphenic carbon particles in the composition is at least 3:1, at least 4:1, at least 5:1, at least 8:1, at least 10:1, or at least 15:1, or at least 30:1, or at least 45:1, or at least 60:1. The present invention is also directed to any electrodepositable composition set forth in this paragraph, wherein the graphenic carbon particles are present in an amount of no more than 20 percent by weight, no more than 10 percent by weight, such as 1 to 10 percent by weight or 1 to 5 percent by weight, based on the total weight of the solids in the composition. The present invention is also directed to any electrodepositable composition set forth in this paragraph, wherein the electrodepositable composition has a total solids content of 0.5 to 25 percent by weight, such as 1 to 10 percent by weight, such as 1 to 5 percent by weight, based on the total weight of the composition.

As will also be appreciated by the foregoing description, in some respects, the present invention is also directed to a lithium ion battery electrode coating electrodeposited on a substrate, the electrodeposited coating comprising: (a) a cured ionic resin; and (b) solid particles comprising: (i) graphenic carbon particles; and (ii) lithium-containing particles, wherein the coating has a weight ratio of solid particles to cured ionic resin of at least 4:1.

The present invention is also directed to any electrodepositable coating set forth in this paragraph, wherein the coating has a weight ratio of solid particles to ionic resin of at least 4:1, at least 5:1, at least 6:1, at least 7:1, at least 8:1, at least 9:1, at least 10:1, at least 11:1, at least 12:1, at least 13:1, at least 14:1, at least 15:1, at least 16:1, or at least 17:1, or at least 45:1, or at least 60:1.

The present invention is also directed to any electrodepositable coating set forth in this paragraph, wherein a water soluble resin is present in the coating in an amount of no more than 20 percent by weight, has no more than 15 percent by weight, no more than 10 percent by weight, no more than 5 percent by weight, such as 1 to 20 percent by weight, 1 to 15 percent by weight, 5 to 15 percent by weight, or 1 to 3 percent by weight, the weight percent being based on the total weight of solids in the coating. The present invention is also directed to any electrodepositable coating set forth in this paragraph, wherein the lithium-containing particles comprise mixed metal oxides comprising Li and at least one element selected from Ni, Co, Fe, Mn, Al and P. For example, the lithium-containing particles may include $LiCoO_2$, $LiNiO_2$, $LiFePO_4$, $LiCoPO_4$, $LiMnO_2$, $LiMn_2O_4$, $Li(NiMnCo)O_2$, and/or $Li(NiCoAl)O_2$, wherein the relative amounts of the transition metals may be varied as desired. For example, Ni, Mn, and Co may not be always in a ratio of 1:1:1 or 3:3:3 and may contain more nickel such as 5:3:2 or as high as 8:2:2. The present invention is also directed to any electrodepositable coating set forth in this paragraph, wherein lithium-containing particles are present in an amount of at least 50 percent by weight, at least 60 percent by weight, at least 70 percent by weight, at least 80 percent by weight, at least 85 percent by weight, or at least 90 percent by weight, based on the total weight of the solids in the coating.

The present invention is also directed to any electrodepositable coating set forth in this paragraph, wherein a relative weight ratio of lithium-containing particles to graphenic carbon particles in the coating is at least 3:1, at least 4:1, at least 5:1, at least 8:1, at least 10:1, or at least 15:1, or at least 30:1, or at least 45:1, or at least 60:1. The present invention is also directed to any electrodepositable coating set forth in this paragraph, wherein the graphenic carbon particles are present in an amount of no more than 20 percent by weight, no more than 10 percent by weight, such as 1 to 10 percent by weight or 1 to 5 percent by weight, based on the total weight of the solids in the coating. The present invention is also directed to any electrodepositable coating set forth in this paragraph, wherein the electrodepositable coating has a total solids content of 0.5 to 25 percent by weight, such as 1 to 10 percent by weight, such as 1 to 5 percent by weight, based on the total weight of the coating.

Illustrating the invention are the following examples, which, however, are not to be considered as limiting the invention to their details.

Example 1

1.0 g of sodium carboxymethylcellulose ("SCMC" commercially available from Sigma-Aldrich Co. LLC) was dissolved in 180 g deionized water. According to the certificate of analysis from the supplier, this material had a degree of substitution of 0.86, and a viscosity of 470 cps was measured using a 2 weight percent solution of CMC in water. According to the product data sheet from the supplier, viscosity was measured with a Brookfield model LVF viscometer using the following parameters: spindle: #3; Speed: 60 rpm; Temperature: 25° C.; Container: 120 ml polybottle; and multiplication factor: 20. The calculated shear rate from these parameters is 12.6 $sec^{-1}$. Assuming viscosity is measured by the supplier with no shear thinning, a viscosity of 470 cps at 2 weight percent concentration estimates a calculated molecular weight of 267,500 using the equation above. Then, 4.2 grams of thermally produced graphenic (TPG) carbon particles produced in the thermal zone of a plasma reactor in accordance with the method described in U.S. Pat. No. 8,486,364 using methane as a precursor material was added and then the mixture was sonicated for 25 minutes. Next, 14.75 g of $LiFePO_4$ ("LFP", Life Power® P2 commercially available from Phostech Lithium Inc.) was added in 4 equivalent portions with each addition followed by 5 minutes of sonication. Finally, an additional 10 minutes of sonication was performed to ensure a uniform dispersion.

This was then diluted with 600 g deionized water to prepare a 2.5% solids electrodeposition bath with a weight ratio of solid particles (TPG+LFP) to ionic resin (SCMC) of 18. To perform coating by electrodeposition, an aluminum foil was wired as an electrode and placed in the stirring 90° F. bath containing a thermocouple and a heating/cooling coil that also acted as the counter electrode, and then the voltage was turned on to 150 volts with a current setting of 1.5 amps. The voltage was turned off after 180 seconds and the coated sample was then removed from the bath and allowed to air dry. The resultant coating had a thickness of 16 microns.

Example 2

A coating was prepared according to the same procedure as Example 1, except the thermally produced graphenic carbon particles were functionalized by the following procedure. Maleic anhydride (1.5 g) was dissolved in Aromatic 150 solvent (423 g) and the plasma produced TPGs (7.5 g) were added. The mixture was ultra-sonicated for 1 hour, then heated to 180° C. under nitrogen with stirring and held for 4 hours. The mixture was cooled, filtered and the product was washed well with acetone and dried. The product was screened through a 100 mesh screen. Then, Jeffamine M-2005 (14 g) was dissolved in 300 g of toluene, and 7 g of the TPG product was added with stirring and the mixture ultra-sonicated for 1 hour. The mixture was transferred to a reaction flask with 300 g of additional toluene, heated to 100° C. with stirring under nitrogen and held for 2 hours. After cooling, the mixture was filtered, washed with toluene then acetone, redispersed in acetone then filtered and washed with acetone and dried. The product was screened through a 100 mesh screen. The functionalized graphenic carbon particles were then combined with lithium-containing particles and ionic resin in a similar manner as described in Example 1 and electrodeposited. The coating was 35 microns thick.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. An electrodepositable composition comprising:
   (a) an aqueous medium;
   (b) an ionic resin; and
   (c) solid particles comprising:
      (i) graphenic carbon particles comprising thermally produced graphenic carbon particles produced by heating a precursor material comprising methane or a hydrocarbon capable of forming a two-carbon fragment species in a thermal zone at a temperature of from greater than 3,500° C. to 20,000° C., wherein the thermally produced graphenic carbon particles have a Raman spectroscopy 2D/G peak ratio of at least 1:1, and have an average aspect ratio of greater than 3:1; and
      (ii) lithium-containing particles,
   wherein the composition has a weight ratio of solid particles to ionic resin of at least 4:1.

2. The electrodepositable composition of claim 1, wherein the composition has a weight ratio of the thermally produced graphenic carbon particles to ionic resin of from 0.1:1 to 2:1.

3. The electrodepositable composition of claim 1, wherein the thermally produced graphenic carbon particles have a B.E.T. specific surface area of greater than 70 square meters per gram.

4. The electrodepositable composition of claim 1, wherein at least a portion of the thermally produced graphenic carbon particles comprise curved, curled, creased or buckled sheets.

5. The electrodepositable composition of claim 1, wherein the thermally produced graphenic carbon particles have a Raman spectroscopy 2D/G peak ratio of at least 1.2:1.

6. The electrodepositable composition of claim 1, wherein the lithium-containing particles comprise mixed metal oxides comprising Li and at least one element selected from Ni, Co, Fe, Mn, Al and P.

7. The electrodepositable composition of claim 1, wherein the lithium-containing particles are present in an amount of at least 50 percent by weight, based on the total weight of the solids in the composition.

8. The electrodepositable composition of claim 1, wherein the composition has a weight ratio of solid particles to ionic resin of at least 8:1.

9. The electrodepositable composition of claim 1, wherein the composition has a total solids content of 1 to 5 percent by weight, based on the total weight of the composition.

10. The electrodepositable composition of claim 1, wherein the ionic resin comprises an anionic resin.

11. A lithium ion battery electrode coating electrodeposited from the electrodepositable composition of claim 1 on a substrate.

12. The lithium ion battery electrode coating of claim 11, wherein the thermally produced graphenic carbon particles comprise 10 weight percent or less of the total weight of the solid particles.

13. The lithium ion battery electrode coating of claim 11, wherein the thermally produced graphenic carbon particles have a B.E.T. specific surface area of greater than 70 square meters per gram.

14. The lithium ion battery electrode coating of claim 11, wherein at least a portion of the thermally produced graphenic carbon particles comprise curved, curled, creased or buckled sheets.

15. The lithium ion battery electrode coating of claim 11, wherein the thermally produced graphenic carbon particles have a Raman spectroscopy 2D/G peak ratio of at least 1.2:1.

16. The lithium ion battery electrode coating of claim 11, wherein the lithium-containing particles comprise mixed metal oxides comprising Li and at least one element selected from Ni, Co, Fe, Mn, Al and P.

17. The lithium ion battery electrode coating of claim 11, wherein the lithium-containing particles are present in an amount of at least 50 percent by weight, based on the total weight of the solids in the composition.

18. The lithium ion battery electrode coating of claim 11, wherein the ionic resin comprises an anionic resin.

* * * * *